(12) United States Patent
Bernard et al.

(10) Patent No.: US 8,356,845 B2
(45) Date of Patent: Jan. 22, 2013

(54) SCOOP DEVICE WITH ARTICULATED-ARM SIFTING ACTION

(75) Inventors: John Harbert Bernard, Atlanta, GA (US); Neal Rosenblum, Hollywood, FL (US)

(73) Assignee: John Harbert Bernard, Atlanta, GA (US)

( * ) Notice: Subject to any disclaimer, the term of this patent is extended or adjusted under 35 U.S.C. 154(b) by 0 days.

(21) Appl. No.: 13/232,852

(22) Filed: Sep. 14, 2011

(65) Prior Publication Data

US 2012/0080893 A1  Apr. 5, 2012

Related U.S. Application Data

(60) Provisional application No. 61/382,902, filed on Sep. 14, 2010.

(51) Int. Cl.
*A01K 1/01* (2006.01)
*B07B 1/02* (2006.01)

(52) U.S. Cl. ............ 294/1.3; 294/179; 209/418

(58) Field of Classification Search ............ 294/1.3, 294/1.4, 9, 179, 8; 209/417, 418, 419
See application file for complete search history.

(56) References Cited

U.S. PATENT DOCUMENTS

| | | | |
|---|---|---|---|
| 46,946 A * | 3/1865 | Schaap | 209/419 |
| 543,710 A * | 7/1895 | Tate | 209/419 |
| 660,527 A * | 10/1900 | Crowther | 209/419 |
| 1,334,169 A * | 3/1920 | Royer | 30/325 |
| 2,522,343 A * | 9/1950 | Canfield | 209/357 |
| 5,076,627 A | 12/1991 | Simon | |
| 5,238,277 A | 8/1993 | Robinson | |
| D347,497 S | 5/1994 | VanSkiver | |
| 5,536,055 A | 7/1996 | Kohn | |
| 5,738,399 A | 4/1998 | Mitchell | |
| 6,022,058 A | 2/2000 | O'Rourke | |
| D426,353 S | 6/2000 | Renforth | |
| D438,349 S | 2/2001 | Keller et al. | |
| 6,234,549 B1 | 5/2001 | Brownell | |
| D465,621 S | 11/2002 | Dunn | |
| 6,578,807 B1 | 6/2003 | Lipscomb et al. | |
| D485,025 S | 1/2004 | Edwards et al. | |
| 7,047,907 B1 | 5/2006 | Johnston | |
| 7,172,229 B2 * | 2/2007 | Gorbet | 294/49 |
| 7,523,973 B2 | 4/2009 | Lin et al. | |
| 2003/0121834 A1* | 7/2003 | Greenberg | 209/235 |
| 2005/0173935 A1* | 8/2005 | Pain et al. | 294/1.3 |

* cited by examiner

*Primary Examiner* — Dean Kramer
(74) *Attorney, Agent, or Firm* — Meunier, Carlin & Curfman, LLC (57) ABSTRACT

A scoop device having a scoop and a handle with an articulated connection that allows for a sift plate to be operated by manual manipulation of an actuator bar. The actuator bar is operatively connected to the sift plate by means of a reciprocating bar in an articulating manner. The sift plate is positioned to slide along the bottom of the scoop. The actuator bar, which is contained within and a part of the handle, may be spring biased. The scoop bottom and sift plate may include slotted openings. Manipulation of the actuator bar causes the reciprocating bar to rotate, in turn causing the sift plate to move back and forth, thereby sifting, straining or otherwise separating fresh particulate from scoop.

20 Claims, 7 Drawing Sheets

SCOOP DEVICE WITH ARTICULATED-ARM SIFTING ACTION

CROSS REFERENCE TO RELATED APPLICATIONS

This application claims the benefit of priority to U.S. Provisional Application No. 61/382,902, filed Sep. 14, 2010, which is incorporated by reference herein in its entirety.

FIELD OF INVENTION

The present invention relates generally to animal waste disposal and, more particularly, to a device for removing animal waste and soiled material from a bed of particulate matter such as cat litter. In addition, an even more particularly, the present invention relates to a scoop device that employs an articulated, reciprocating motion that allows the user to sift, strain or otherwise separate fresh particulate matter from the scoop.

BACKGROUND

The care of pets is a substantial undertaking. In addition to feeding and general healthcare, a pet owner must also tend to pet waste disposal. This is particularly true for cats, which are often house bound animals. A conventional method of addressing cat waste product is to provide a tray or similar container that holds particles or granules of absorbent litter. The cat is trained to urinate and defecate in the "litter box," thereby affording the owner a more convenient opportunity to retrieve and dispose of the waste and soiled litter.

Different types of litter are known in the art. One type of litter is often referred to as "clumping litter." This type of litter forms "clumps" when wetted, as when a cat urinates in the litter box. The clumps can be removed from the box along with any feces and soiled litter to leave the remaining fresh litter available for future use.

It is well known to provide a scoop or other hand-held device to facilitate the removal of feces, soiled litter and litter clumps. In fact, a wide variety of litter scoops are known in the prior art. For example, U.S. Pat. No. 5,076,627 discloses a "Scoop for Cat Litter" that includes a shovel-like end portion with a bottom panel, two side panels, and a rear panel that allow the user to dig out waste and soiled litter from a litter box or the like. The disclosed panels include elongated slotted openings to sift on strain the litter for disposal. The slots thus allow the user to strain waste material and soiled litter from the fresh litter, and return the fresh litter to the litter box for future use. The operation may entail shaking the scoop, which can result in spilling some of the litter. A shield is provided at the rear panel to protect a user from contact with litter as a result of the straining or sifting operation. A user of such a device may not vigorously shake the scoop in order to avoid spills.

As a further example, U.S. Pat. No. 6,234,549 discloses a "Dual Action Scooper for Clumping and Non-Clumping Cat Litter" that is configured to segregate and lift-away wet cat litter. The rear portion of the scooping blade provides a containment-bowl area, effectively holding wet cat litter when the handle is tilted down. Yet another example is shown in U.S. Pat. No. 6,022,058, which discloses a "Vibrating Cat Litter Scoop." That disclosed scoop provides a vibrating mechanism activated by a thumb switch located at the handle of the device. Upon activation, the vibrating mechanism imparts an oscillating movement to accelerate the manual steps of insertion, pushing, lifting and sifting the litter.

A further example is shown in U.S. Pat. No. 7,523,973, which discloses a "Thermoformed Litter Scoop." That disclosed scoop provides a generally concave scoop portion having a plurality of openings defined to allow the passage of litter particulates therethough. That disclosed invention is characterized by reinforcing ribs. More particularly, the disclosed scoop discloses at least two handle supporting ribs that extend along substantially the entire length of the handle portion and into the central portion of the scoop portion, and at least two scoop supporting ribs extending outwardly into the handle-scoop connecting region along an upper portion of each side of the rear wall of the scoop portion.

Yet another scoop is offered under the trademark "DuraScoop," which provides a slotted, concave scoop portion with an integral handle. The slotted scoop portion is fitted with a matingly-configured slotted, concave closure panel that sits immediately below the scoop. The closure panel includes an integrally formed button that extends both above and below the handle of the scoop so as to be manipulated by a user. Manipulation of the button relative to the handle slides the closure panel relative to the scoop. In a first position, the closure panel slots are aligned with the scoop portion slots so that litter can exit the scoop. Thus, the "DuraScoop" device provides for manual sifting or straining of the litter along the line of that addressed by U.S. Pat. No. 5,076,627. However, in order to avoid spillage, the "DuraScoop" product provides a button that may be depressed toward the handle so as to slide the closure panel forward relative to the scoop. When fully depressed to a second position, the slots in the scoop are covered by the closure panel so that neither litter nor waste material may spill out of the concave scoop. The user of this "DuraScoop" device is thus provided with the ability to selectively retain all material captured by the scoop, including waste material and soiled litter, for disposal. If the user wishes to sift or strain the litter, the "DuraScoop" product's slidable closure panel may be returned to the first position by an upward movement of the user's index finger on the button portion below the handle, which operates to return the button to its original, first position and aligns the scoop's and closure panel's respective slots to facilitate sifting and straining. Consistent therewith, the "DuraScoop" product's advertising states: "Slots close to prevent spills" and "Waste goes in trash not on floor." See http://www.durascoop.com/original.php?productid=2#iding. The purpose and effect of the "DuraScoop" product's closure panel is to provide a mechanical cover that precludes material from exiting the scoop prematurely; it prevents spillage.

It is, of course, desirable to scoop soiled litter, clumped litter and waste material in such a manner as to prevent spills. Even so, it is also desirable to facilitate the straining and sifting of used (or clumped) litter and waste from the fresh, still useable litter. While each of the foregoing devices provides utility, there is a need in the art for a scoop that not only prevents spills, but also assists and facilitates, even enhances, the straining and sifting operations routinely associated with the use of a standard scoop.

SUMMARY

The present invention provides an improved scoop device that facilitates the removal of waste material and soiled particulate, and the sifting and straining of fresh particulate from the scoop for future use. A scoop according to the present invention includes a slotted scoop portion and an integral handle assembly. A scoop according to the present invention further includes a slidable, slotted sifter plate that cooperates with the slotted scoop portion to facilitate and enhance the sifting and strain operations. The sifter plate is operatively connected to a reciprocating bar that is received and mounted within the handle assembly. The reciprocating bar is also operatively connected to an activator bar that forms a part of the handle assembly. These connections provide an articulation such that when the actuator bar is moved, the reciprocating bar operates to move the slotted sifter plate relative to the scoop portion so as to uncover and cover the slotted openings in the scoop. The action of the sifter plate relative to the scoop facilitates straining and sifting. The activator bar is spring loaded so that it is easily, repeatedly manipulated to affect the desired sifting and straining operations. Thus, not only does the present scoop facilitate removal of soiled litter and waste material, it also prevents spillage and facilitates the straining and sifting operations associated with the scooping and processing of particulate matter.

It is therefore an object of the present invention to provide an improved scoop for removing waste material and soiled litter from a litter box.

It is another object of the present invention to provide an improved scoop with a repeatedly and easily slidable sifter plate.

It is another object of the present invention to provide an improved scoop that facilitates the operations of sifting and straining soiled litter and waste material from fresh litter.

It is another object of the present invention to provide an improved scoop with an articulating arm assembly that facilitates manipulation of a sift or sifter plate that, in conjunction with the scoop, provides easier, more effective sifting and straining of waste and soiled litter than done using prior art scoops.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
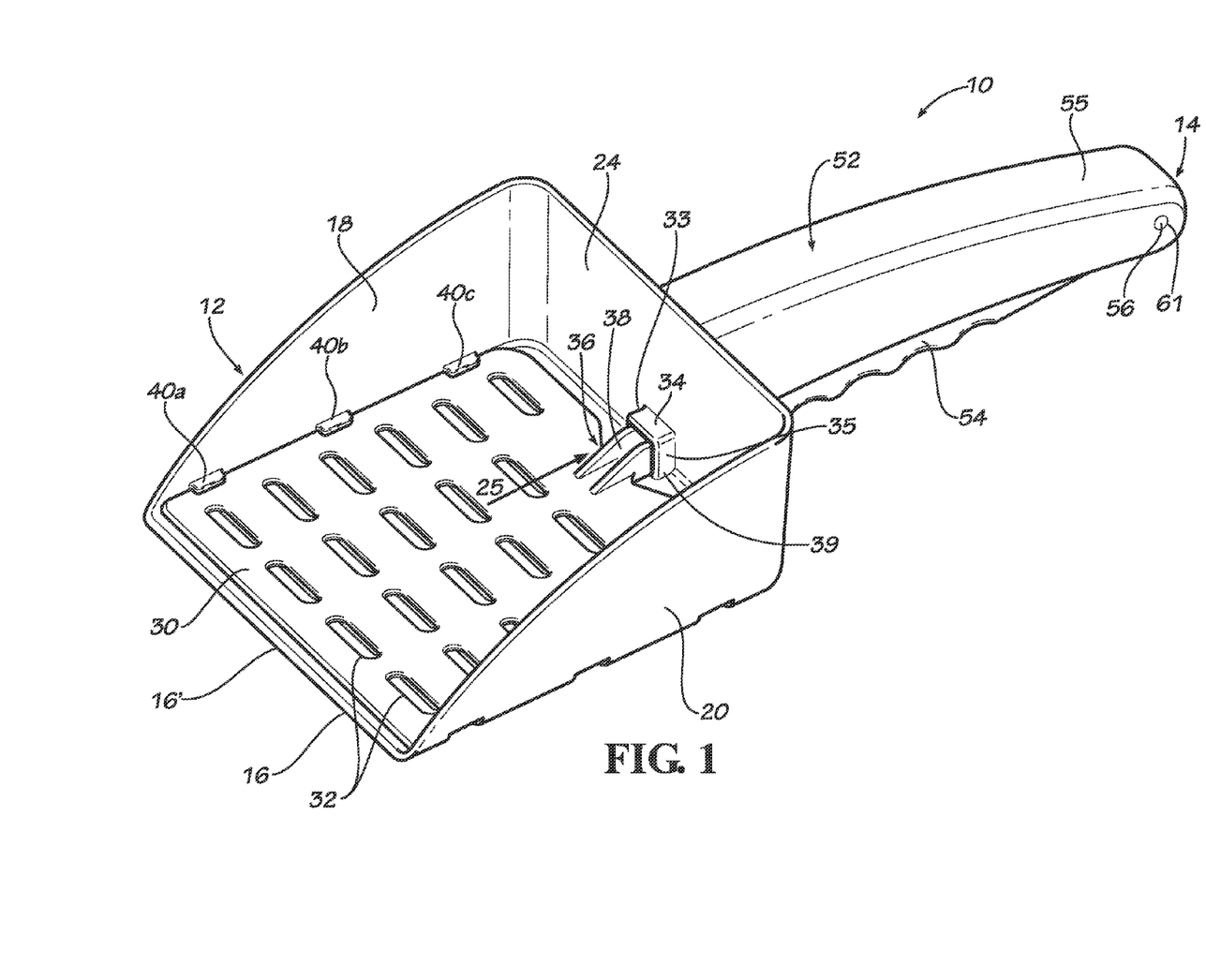
FIG. 1 is a perspective view of a scoop in accordance with the present invention, showing the sift plate in a first, closed position.

Referring now in more detail to the drawings, in which like numerals indicate like elements throughout the several figures, and improved scoop according to the present invention is shown generally at 10 in FIG. 1. The scoop 10 of the present invention includes a forward scoop portion 12 and an integrated handle assembly 14. The forward scoop portion 12 is defined by a floor 16 having a plurality of slots 17 (described in greater detail below) and side walls 18 and 20. The forward scoop portion 12 further includes a rear wall 24. The walls 18, 20, and 24 project upwardly from the floor 16 and may, if desired, be formed integrally therewith. The walls 18, 20, and 24 may be of any suitable configuration so long as they are adequate to return the waste and soiled litter being scooped by a user. As shown in FIG. 1, one embodiment of the side walls 18 and 20 is to provide a tapered or rounded configuration that allows for an easier scooping of particulate material into the forward scoop portion 12 of the device. As also shown in FIG. 1, one embodiment of the rear wall 24 is of sufficient height as to preclude particulate matter or soiled material from spilling out of the forward scoop portion 12. The rear wall is also preferably sufficient to support the handle assembly 14.

Figure 2:
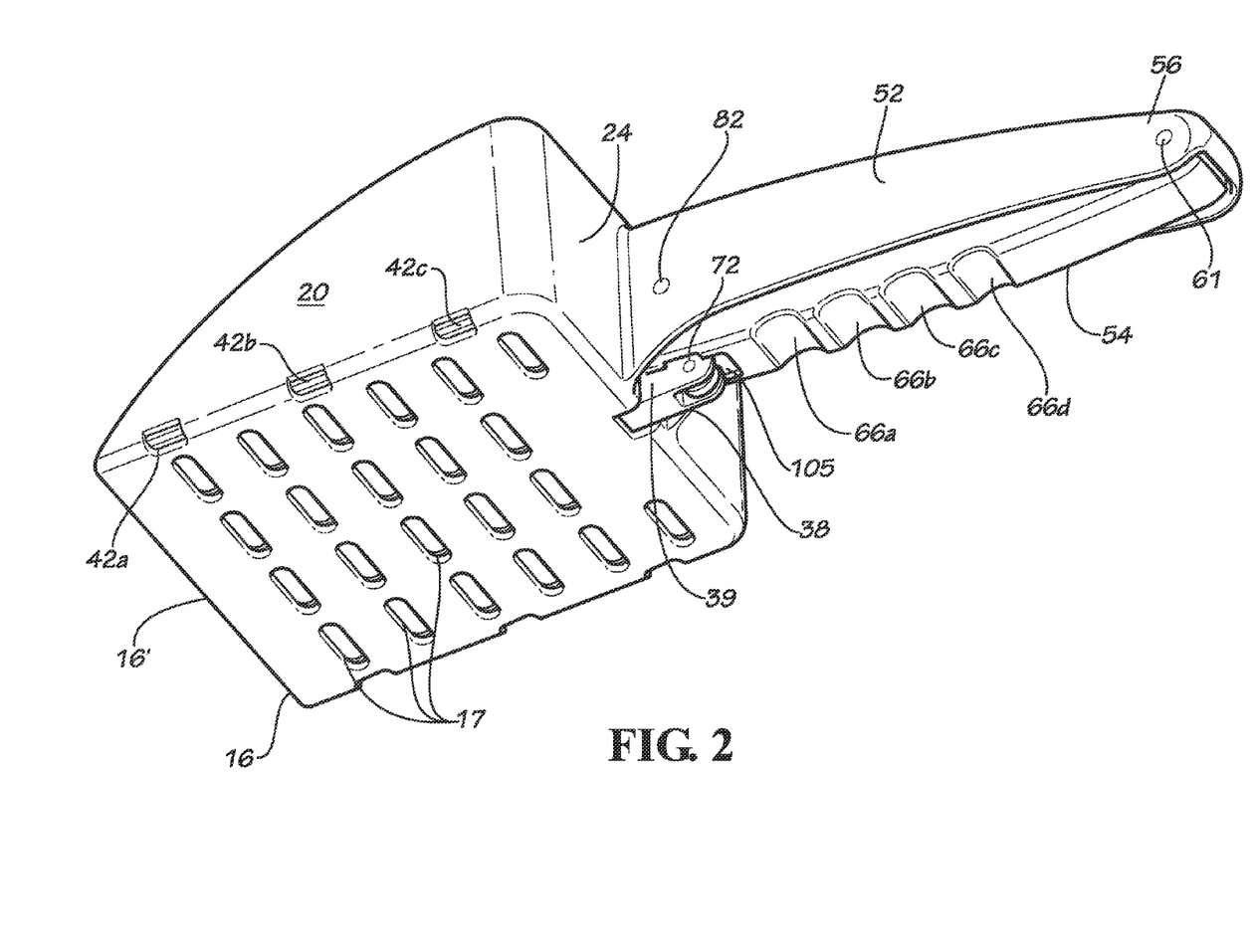
FIG. 2 is a perspective view of the scoop shown in FIG. 1, with the handle compressed such that the sift plate is in a second, open position.
Figure 3:
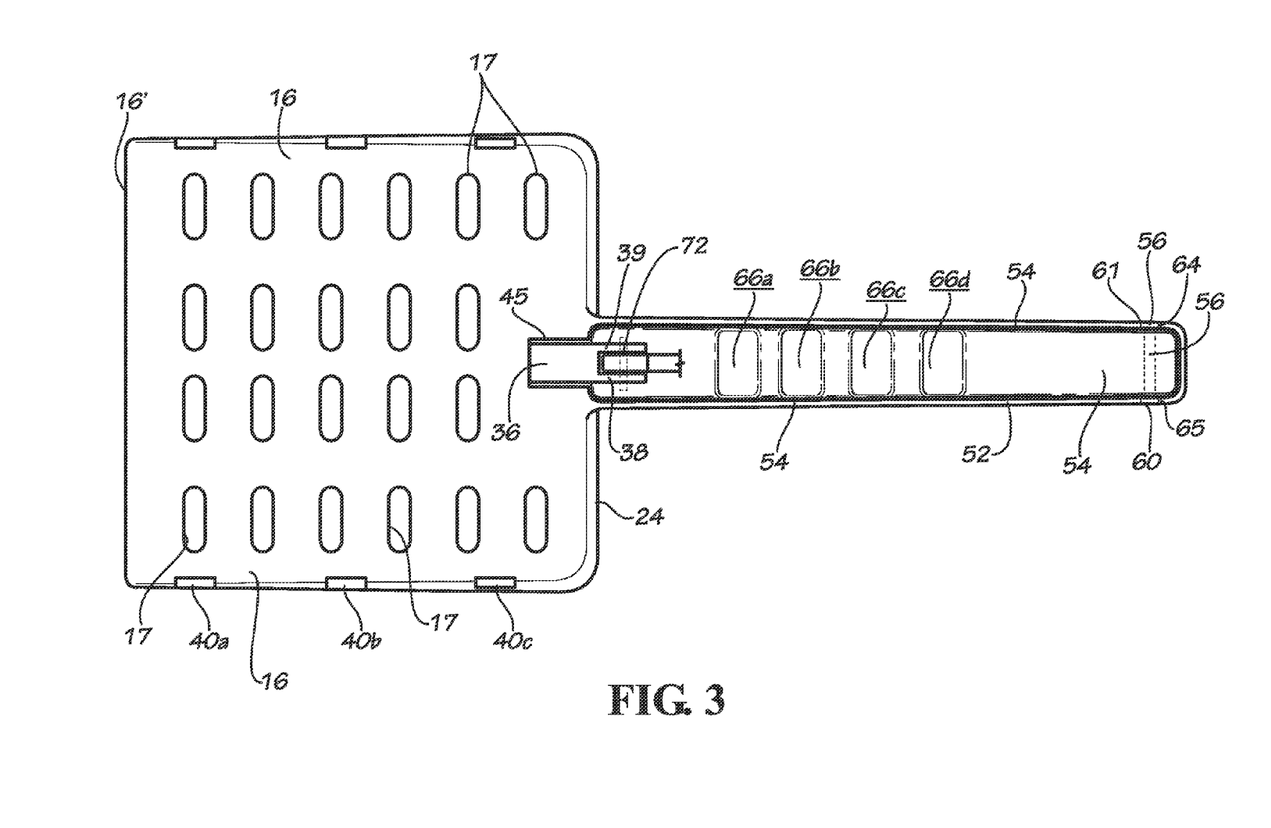
FIG. 3 is a bottom view of the scoop shown in FIG. 1.
Figure 4:
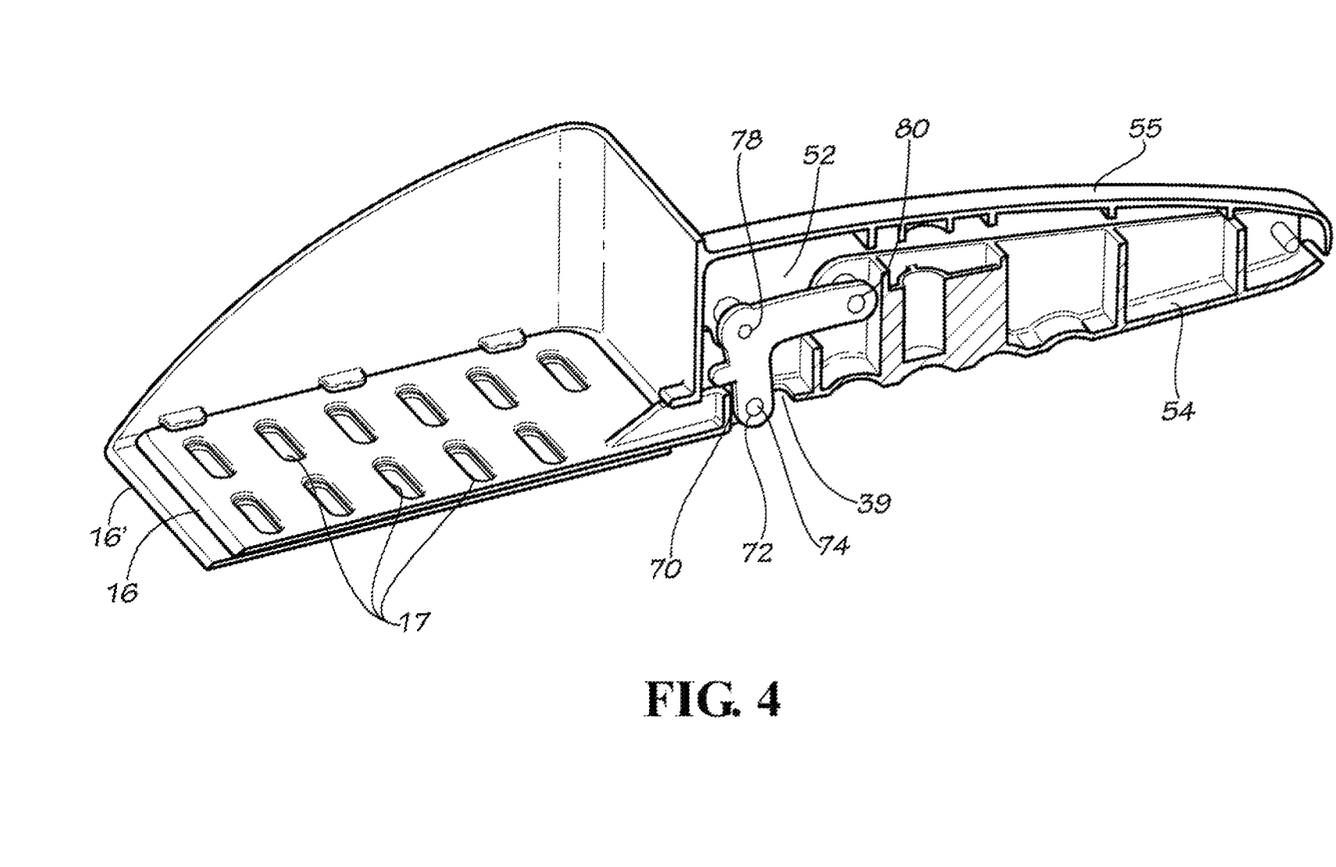
FIG. 4 is a cut-away view of the scoop shown in FIG. 2.

The scoop portion floor 16 defines a leading edge 16' and includes plurality of slotted openings 17. If desired, the leading edge 16' may be beveled to assist in the insertion of the scoop into the particulate matter. The openings 17 may be of any suitable size and configuration. For example, the openings 17 in the scoop portion floor 16 shown in FIG. 2 are spaced apart one from the other, provided in four longitudinal columns, and aligned so as to form a series of rows that run transverse thereto. This and many other configurations are within the scope of the present invention.

Further to FIG. 1, the rear wall 24 of the forward scoop portion 12 defines an opening 25. The opening 25 is formal by walls 33, 34 and 35. The walls 33 and 35 project upwardly from the floor 16 to define the sides of the opening 25. The forward scoop portion 12 further includes a sift or sifter plate 30 that is configured to and cooperates with the scoop floor 16. The sifter plate 30 is configured to sit and slide within and between the leading edge 16' of the floor 16 and the walls 18, 20 and 24. The sifter plate 30 defines a plurality slotted openings 32. It will be appreciated that the sifter plate openings 32 may be of any suitable size and configuration, but are preferably constructed to cooperate with the slotted openings 17 in the floor 16. The rear portion of the sifter plate 30, the portion closest to the handle assembly 14, is integrally formed with a connector 36. The connector 36 is preferably configured to slide freely back and forth in and through the opening 25 defined in rear wall 24. As will become apparent, retraction of the connector 36 within the opening 25 will correspondingly slide the sifter plate 30 within the forward scoop portion 16 of the scoop device 10. To assist in that operation, the side walls 18 and 20 provide a series of detents 40*a-c* and 42*a-c*, respectively, to constrain and guide the sifter plate 30. Thus, the plate 30 is prevented from moving vertically or otherwise being dislodged from the connector 36.

The opening 25 defines the mouth of a channel 45. The connector 36 is configured to fit within the channel 45. Thus, the sift plate 30 is maintained to slide closely against the floor 16 and the connector 36 remains in a position to travel freely back and forth within the opening 25 defined in the rear wall 24. At its forward end, the connector 36 is secured to, and may be integrally formed with, the sift plate 30. At is rearward end, the connector defines two plates 38 and 39 that are operatively secured to the handle assembly 14 as described herein below. The person of ordinary skill will appreciate that the plates or ribs 38, 39 also serve to strengthen the connector 36.

The handle assembly 14 includes a stationary upper housing 52 and a lower actuator bar 54. The upper housing 52 may be formed integrally with the rear wall 24 of the forward scoop portion 12. The upper housing 52 is hollow, defines an upper handle surface 55 and receives the actuator bar 54 as described below.

The lower actuator bar 54 is an elongated member that extends substantially the length of the upper housing 52 and is attached thereto by means of a fixed pin 56 supported within the upper housing 52. Described more particularly, the upper housing 52 defines aligned openings 60 and 61 at its rearward end. In like fashion, the actuator bar 54 defines two correspondingly aligned openings 64 and 65 at its rearward end. Pin 56 is configured to extend through opening 60 in the upper housing 52, opening 64 in the actuator bar 54, opening 65 in the actuator bar 54 and opening 61 in the upper housing 52, so that the actuator bar is pivotally secured at its rearward end portion within the stationary upper housing 52. The actuator bar 54 is first positioned at a position partially removed from the upper housing 52 such that the actuator bar 54 sits and projects below the upper housing 52. It is to be understood that the actuator bar 54 may be moved to a second position so as to be retracted into the upper housing 52. Further, the actuator bar 54 is able to be returned to the first position where it is extended outside of or beyond the upper housing 52.

Described in more detail with reference to FIG. 2, the actuator bar 54 is pivotally secured within the upper housing section 52 by means of the pin 56. In a first position, the actuator bar 54 is biased away from the upper housing 52 as shown in FIG. 1. The handle assembly 14 may be squeezed by a user such that the actuator bar 54 will pivot about the pin 56 and be retracted or nested into the upper housing 52. The actuator bar 54 is thus moved toward the top surface 55 of the upper housing section 52 by squeezing the handle assembly 14. To facilitate such manipulation of the actuator bar 54, its lowest edge may be provided with a series indentations 66a-d for receipt of a user's fingers. Such indentations 66a-d guide the user's hand to a proper position so that the user enjoys a certain leverage in manipulation of the actuator bar 54. FIG. 2 shows the actuator bar 54 in a retracted or nested position relative to the upper housing 52.

Figure 5:
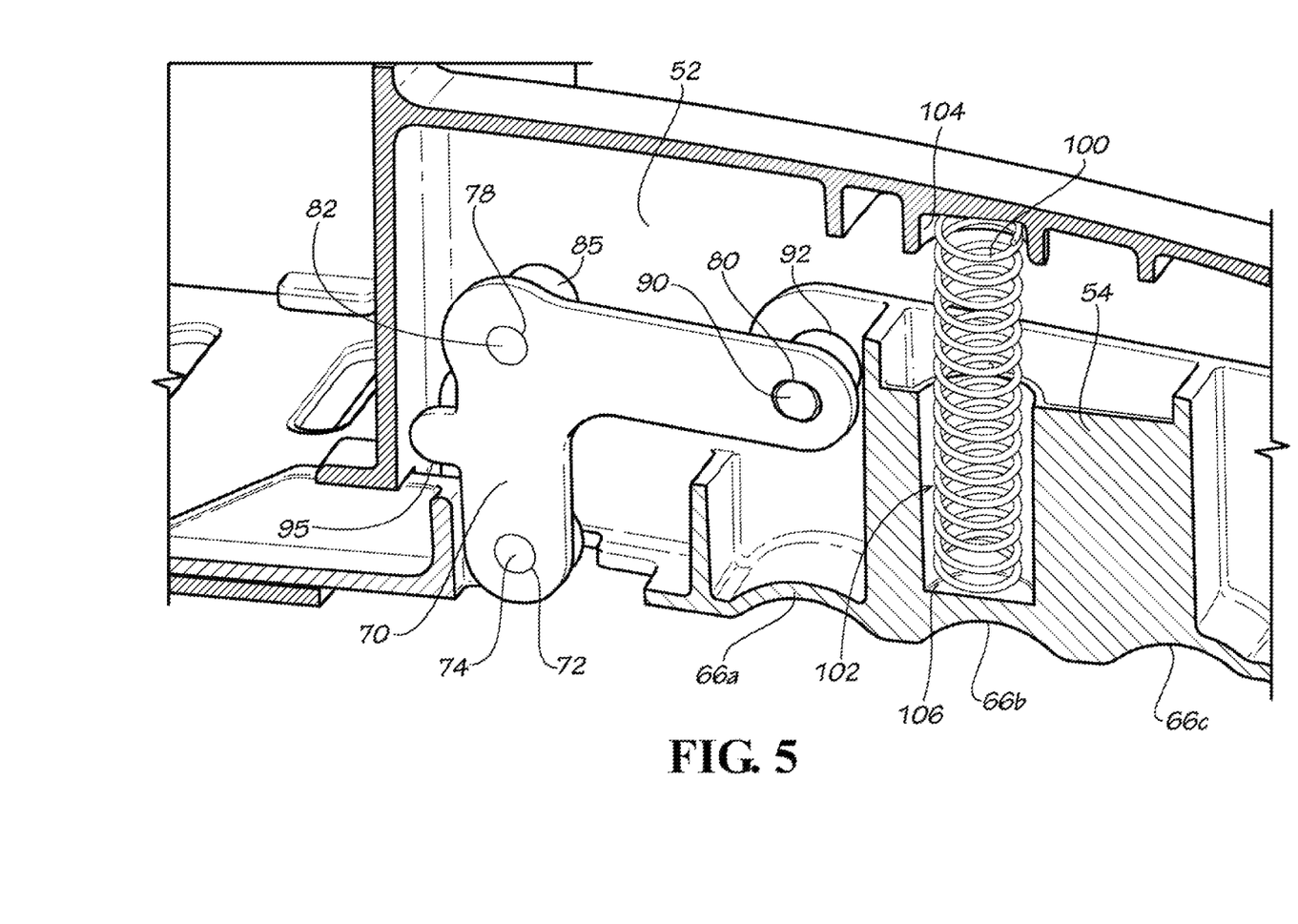
FIG. 5 is a cut-away, partial view of the scoop shown in FIG. 1, specifically showing the reciprocating or contained within the handle assembly.

It will be appreciated that depression or movement of the actuator bar 54 into the upper housing section 52 or squeezing the handle assembly 14 causes the sift plate 30 to slide. This action is accomplished by an articulated connection of the actuator bar 54 to the sift plate 30 by means of the connector 36 and a reciprocating arm 70. As shown in FIG. 5, the reciprocating arm 70 is L-shaped. At its lower most end, the reciprocating arm 70 defines an opening 72. The reciprocating arm defines an upper and forward opening 78 and an upper and rearward opening 80. At its lower, forward end, the reciprocating arm 70 is secured to connector plates 38 and 39 of the connector 36 by a pivot pin 74 that is positioned within the opening 72 and thereby secured between plates 38 and 39. Pin 74 is not stationary. By virtue of this connection, a lateral movement of the pivot pin 74 causes the connector 36 and the shift plate 30 to move correspondingly in a lateral direction.

Opening 78 is provided in the forward, upper position of L-shaped reciprocating arm 70 and defines a pivot point for the reciprocating arm 70 itself. More particularly, the interior walls of the upper housing 52 are fitted with mating and integral pin supports, one of which is shown at 85 on FIG. 5. The person of ordinary skill in the art will understand that a like pin support that mirrors support 85 is provided (but not shown) on the opposing interior wall of the upper housing 52. A pivot pin 82 is received and supported by the support 85 and its like support on an opposing interior wall of the upper housing 52. Pin 82 is maintained in a fixed position within the upper housing 52 so that the reciprocating arm 70 can pivot about that point. The reciprocating arm 70 further includes an opening 80 through which a pin 90 extends. The pin 90 is secured to an interior portion of the lower actuator bar 54 by a pin support 92. The pin support 92 is preferably formed as an integral portion of the interior of the lower activator bar 54. The person of ordinary skill in the art will understand that a like pin support that mirrors support 92 is provided (but not shown) on the opposing interior wall of the lower actuator bar 54. Thus, the pin 90 is fixed to and moves with the actuator bar 54. When the actuator bar 54 is moved toward (or into) the upper housing 52, pin 90 is likewise moved upwardly (when positioned as in FIG. 5) in a counter clockwise direction toward the top surface 55 of upper housing section 52 (as shown in FIG. 5, generally an upward movement).

The reciprocating arm 70 is caused to pivot about pin 82, thereby causing pin 74 to travel laterally toward the rear portion of the handle assembly 14. Because pin 74 is engaged to the connector 36, and the connector 36 is engaged to the sift plate 30, both are correspondingly moved toward the rear of the handle assembly 14. Hence, hence the sift plate 30 slides toward the rear of the scoop device 10 relative to the front scoop floor 16. Return of the activator bar 54 to its original position by a downward, clockwise rotation of the pin 90 in reciprocating arm 70 (as shown in FIG. 5) causes the pin 74 to move laterally forward and in turn slide the sift plate 30 to an original, first position. The person of ordinary skill will appreciate that because the reciprocating arm 70 rotates about the pin 82, the openings 72 and 80 do not move in a straight line. Rather, the openings 72 and 80 will traverse an arc. Thus, the openings 72 and 80 may be elongated or slotted to accommodate substantially straight-line lateral movement of the pin 74 and substantially straight-line vertical movement of the pin 90.

Figure 6:
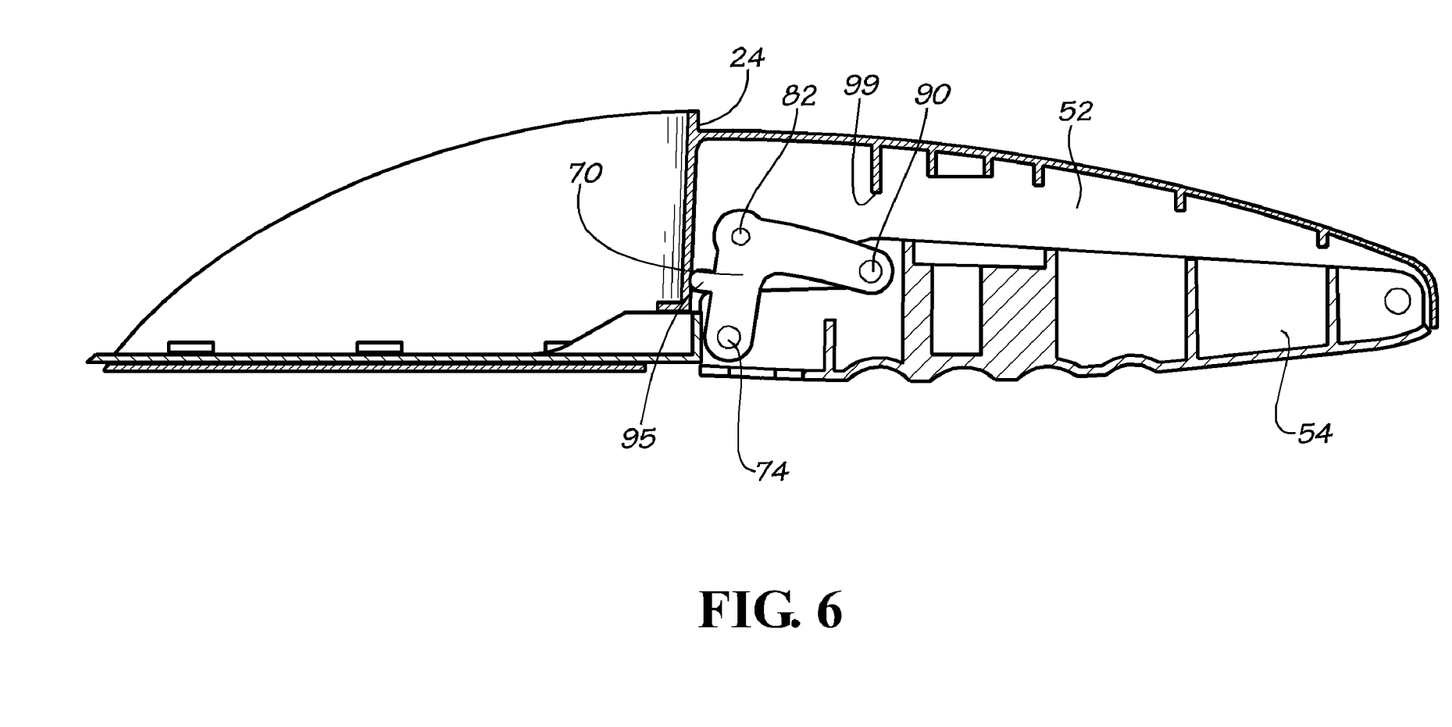
FIG. 6 is a cut-away view of the device showing in FIG. 1, showing the actuator arm distant from the housing and that the sifter plate is in a first, closed position.
Figure 7:
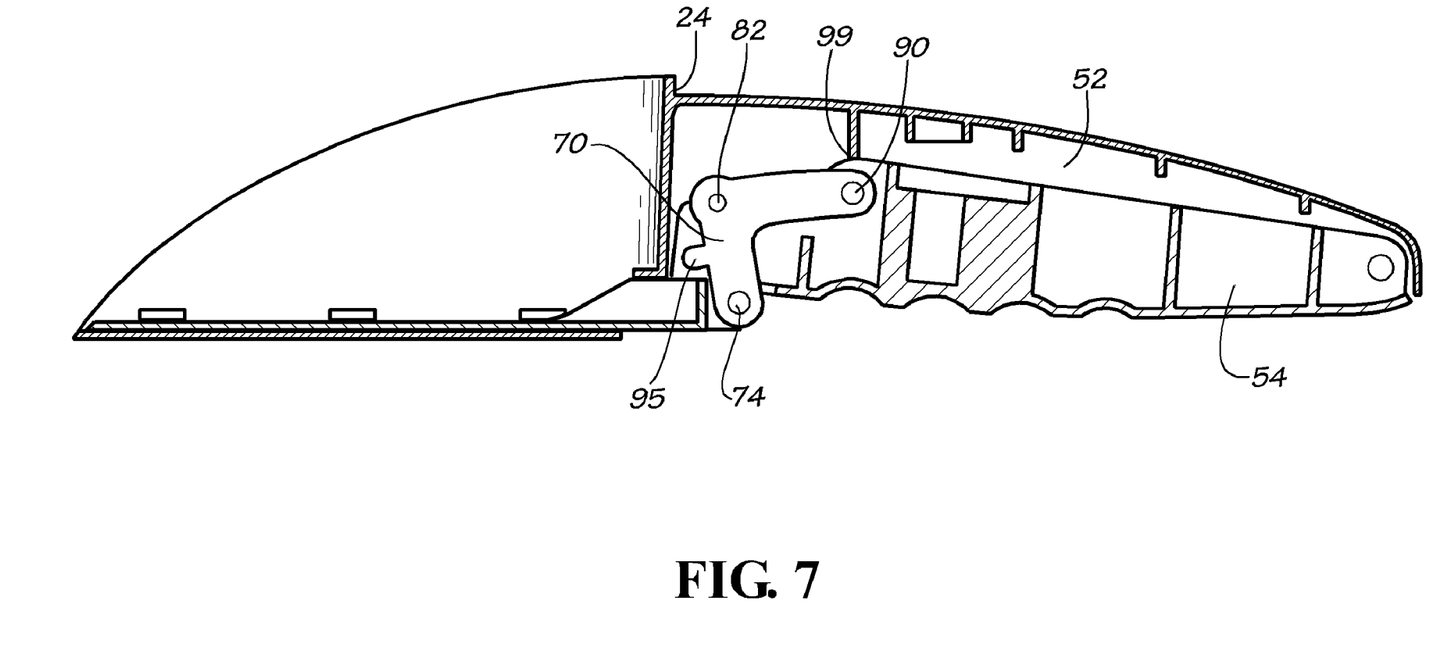
FIG. 7 is a cut-away view of the device similar to that of FIG. 6, showing the actuator arm compressed or moved into the upper housing such that the sifter plate is in a second, open position.

The reciprocating arm 70 includes a stop extension 95 that operates to limit the travel of the activator bar 54 away from the upper housing 52. The stop extension 95 projects forwardly of the reciprocating arm 70 a sufficient distance to engage the rear wall 24 and thus stop movement of the actuator bar 54 as shown in FIG. 6. Conversely, travel of the actuator bar 54 into the upper housing 52 is limited by an internal stop surface 99 of the upper housing (see FIGS. 6 and 7). The top surface 55 of the actuator 54 contacts the surface 99 to stop its movement into the upper housing 52.

The handle assembly 14 further includes a spring 100 that is provided in a cavity 102 within said assembly. The spring 100 may be a compression spring. However, the person or ordinary skill will recognize that other types of springs, such as a leaf or tension spring, could be adapted for use in the invention. The top end of the spring 100 is constrained by a ceiling 104 of the cavity 102, which is a portion of the housing 52. The lower end of the spring 100 is constrained by a floor 106 of the cavity 102, which is a portion of the actuator bar 54. The spring is biased to urge the actuator bar 54 away from the upper housing 52. Thus, when at rest, the actuator bar 54 is maintained in a first extended position such that the actuator bar 54 is extended from an outside of the upper housing 52. When a user squeezes the handle assembly 14, the actuator bar 54 is moved into or forcible retracted into the upper housing 52 to a second position and the spring 100 is compressed. When the user releases the actuator bar 54, the spring 100 bar causes the actuator bar 54 to return to its first original position. As described above, such as a result of the articulating action of the connector 35, the reciprocating arm 70 and the pin 90 fixed to the actuator bar 54, manipulation of the actuator bar 54 slides the sift plate 30. The first position of the actuator bar 54 preferably defines a closed position of the sift plate 30, and the second position of the actuator bar 54 (fully retracted within the upper housing 52) preferably defines an open position of the sift plate 30. It will be appreciated that by virtue of the spring 100, mere release of the actuator bar 54 will allow and cause it to return to its original, first position.

The upper housing 52 and the actuator bar 54 are preferably configured to permit smooth working of the reciprocating arm 70. Thus, for example, an opening 105 is provided in the forward bottom portion of the actuator bar 54 to accommodate the rearward portions of the connector plates 38, 39, the pin 74 and the lower portion of the reciprocating arm 70 can travel rearwardly without interruption. Similarly, the upper wall of the lower actuator bar 54 may be configured so that it does not contact the actuator bar 54. In one embodiment, the walls of the lower activator bar 54 are forced to have a cut-out section so that the actuator bar 54 will not contact or be interrupted by the fixed supports 85.

Those of ordinary skill in the art will appreciate that the foregoing description of the embodiments are written to the person of ordinary skill in the art, who may make various modifications thereto that are within the scope of the invention as defined by the below and within claims.

What is claimed is:

1. A scoop comprising:
a handle assembly including an actuator bar and a reciprocating arm that is responsive to the actuator bar;
a scoop portion defining a floor and a rear wall;
a sifter plate configured to slide along the floor; and
an articulated connection connected to the reciprocating arm and the sifter plate,
whereby, upon manipulation of the actuator bar in a direction that is substantially perpendicular to a plane of the floor of the scoop, the sifter plate is slid along the floor of the scoop in a direction that is substantially parallel with the plane of the floor of the scoop.

2. The scoop of claim 1, wherein the floor and the sifter plate include slotted openings.

3. The scoop of claim 2, wherein the actuator bar is biased into an original, first position.

4. The scoop of claim 3, wherein the actuator bar is biased into the original, first position by a spring, thus causing the slotted openings of the sifter plate not to be aligned with the slotted openings of the floor.

5. The scoop of claim 3, wherein the handle assembly further comprises an upper housing section, and wherein the actuator bar is nested with the upper housing section.

6. The scoop of claim 5,
wherein the handle assembly further comprises a spring,
wherein a top of the spring contacts the upper housing section, and
wherein a bottom of the spring contacts the actuator bar.

7. The scoop of claim 1, wherein the actuator bar is configured to be manipulated by a squeezing motion of an entire hand of a user.

8. The scoop of claim 1,
wherein the reciprocating arm is L-shaped;
wherein the manipulation of the actuator bar in a direction substantially perpendicular to a plane of the floor of the scoop causes movement of the L-shaped reciprocating arm; and
wherein the movement of the L-shaped reciprocating arm causes movement of the sifter plate along the floor of the scoop in a direction that is substantially parallel to the plane of the floor of the scoop.

9. The scoop of claim 8, wherein the handle assembly further comprises an upper housing section, and wherein the actuator bar is nested with the upper housing section.

10. The scoop of claim 9,
wherein the handle assembly further comprises a spring,
wherein a top of the spring contacts the upper housing section, and
wherein a bottom of the spring contacts the actuator bar.

11. A scoop comprising:
a handle assembly including an actuator bar and a reciprocating arm that is responsive to the actuator bar;
a scoop portion defining a floor and a rear wall;
a sifter plate configured to slide along the floor; and
an articulated connection connected to the reciprocating arm and the sifter plate;
whereby, upon manipulation of the actuator bar, the sifter plate is slid along the floor of the scoop;
wherein manipulation of the actuator bar exerts a first force on the reciprocating arm that exerts a second force on the sifter plate; and
wherein the second force is greater than the first force.

12. The scoop of claim 11, wherein the floor and the sifter plate include slotted openings.

13. The scoop of claim 12, wherein the actuator bar is biased into an original, first position.

14. The scoop of claim 13, wherein the actuator bar is biased into the original, first position by a spring, thus causing the slotted openings of the sifter plate not to be aligned with the slotted openings of the floor.

15. The scoop of claim 13, wherein the handle assembly further comprises an upper housing section, and wherein the actuator bar is nested with the upper housing section.

16. The scoop of claim 15,
wherein the handle assembly further comprises a spring,
wherein a top of the spring contacts the upper housing section, and
wherein a bottom of the spring contacts the actuator bar.

17. The scoop of claim 11, wherein the actuator bar is configured to be manipulated by a squeezing motion of an entire hand of a user.

18. The scoop of claim 11,
wherein the reciprocating arm is L-shaped;
wherein the manipulation of the actuator bar causes movement of the L-shaped reciprocating arm; and
wherein the movement of the L-shaped reciprocating arm causes movement of the sifter plate along the floor of the scoop.

19. The scoop of claim 18,
wherein the handle assembly further comprises an upper housing section and a spring;
wherein the actuator bar is nested with the upper housing section;
wherein a top of the spring contacts the upper housing section, and
wherein a bottom of the spring contacts the actuator bar.

20. A scoop comprising:
a handle assembly including a housing section, a spring, an actuator bar, and a reciprocating arm that is responsive to the actuator bar;
a scoop portion defining a floor having slotted openings and a rear wall;
a sifter plate comprising slotted openings; and
an articulated connection connected to the reciprocating arm and the sifter plate;
wherein the sifter plate is configured to slide along the floor of the scoop portion;
wherein the actuator bar is nested with the housing section;
wherein a top of the spring contacts the housing section and a bottom of the spring contacts the actuator bar;
wherein the actuator bar is biased into a position by the spring;
whereby, upon squeezing the actuator bar within the housing section using at least two fingers in a direction substantially perpendicular to a plane including the floor of the scoop, the sifter plate is slid along the floor of the scoop in a direction substantially parallel to the plane including the floor of the scoop.

* * * * *